United States Patent [19]

Andersson

[11] Patent Number: 4,726,122
[45] Date of Patent: Feb. 23, 1988

[54] WHEEL ALIGNMENT APPARATUS FOR VEHICLES

[75] Inventor: Paul Andersson, Falköping, Sweden
[73] Assignee: Nicator AB, Eskilstuna, Sweden
[21] Appl. No.: 926,090
[22] Filed: Nov. 3, 1986
[51] Int. Cl.⁴ .......................................... G01B 11/275
[52] U.S. Cl. ...................................................... 33/288
[58] Field of Search ................... 356/155, 154; 33/286, 33/288, 203.18, 335, 336

[56] References Cited

U.S. PATENT DOCUMENTS 4,337,581 7/1982 Eck ........................................ 33/288
4,338,027 7/1982 Eck .

FOREIGN PATENT DOCUMENTS 2160970 1/1986 United Kingdom ................ 356/155

Primary Examiner—Harry N. Haroian
Attorney, Agent, or Firm—Young & Thompson

[57] ABSTRACT

An apparatus for measuring the wheel alignment of the wheels of vehicles includes a target provided with a plurality of scales for accomplishing the measurements. The target is pivotally attached to a support shaft of a target support structure and can be positioned in arbitrary locations around the shaft. A line of sight from a sighting instrument can be directed to impinge on the respective scales of the target facing the instrument.

5 Claims, 15 Drawing Figures

WHEEL ALIGNMENT APPARATUS FOR VEHICLES

This invention relates to an apparatus for checking the alignment of the wheels of a wheeled vehicle, i.e. angular relationships such as caster, camber, toe-in, toe-out and king pin inclination.

Such alignment checks must be done for example during straightening operations on a damaged vehicle or when wheel misalignment is suspected due to vehicle handling difficulties or certain tire wear patterns.

An object of the invention is to make use of an existing optical measuring system on work benches for straightening operations in an apparatus for checking the alignment of the wheels of a wheeled vehicle in order to facilitate the measuring of wheel alignment during straightening work without the need of moving the vehicle from such a bench.

A further object of the invention is to construct such an apparatus which is easy to handle and utilizes a minimum of components.

These objects are accomplished by an apparatus according to the invention, which uses the optical measuring system incorporated in the straightening bench marketed under the trade name "Dataliner 80", which is described in Swedish Pat. Nos. 7103780-8, 7202023-2 and 8003079-4 as well as Swedish patent applications Nos. 8102307-9 and 8102306-1. For use in the inventive arrangement, said system comprises in its most simple embodiment a bar, which upon application of the inventive measuring device is to be placed in front of the vehicle and substantially at right angles to the longitudinal axis thereof. A laser beam is emitted in parallel alongside the bar. One or two deflection units are arranged to deflect the laser beam towards the vehicle at an angle to the bar. In the most simple embodiment this angle is perpendicular, but in some applications it can be set to several, for example five accurate angular positions. Each deflection unit is displaceable along the bar, and the movements can be recorded either manually or automatically. As already mentioned, a measuring bar of this type can be placed as a supplementary part in connection with a straightening bench, although it is of course also conceivable within the scope of the invention for such a measuring bar to have a separately detached position in front of the vehicle.

An essential feature of the invention is the particular target used together with said optical system. This target contains all scales necessary for checking the wheel alignments and is easy to handle for an operator and readily removable from its attachment on a wheel.

The invention also provides for a method for checking the alignment of the wheels of a wheeled vehicle, which method is easy to learn and to carry out.

Other objects and advantages of the invention will become apparent from the following description taken in connection with the accompanying drawings wherein certain embodiments of this invention are illustrated by way of example.

Figure 1:
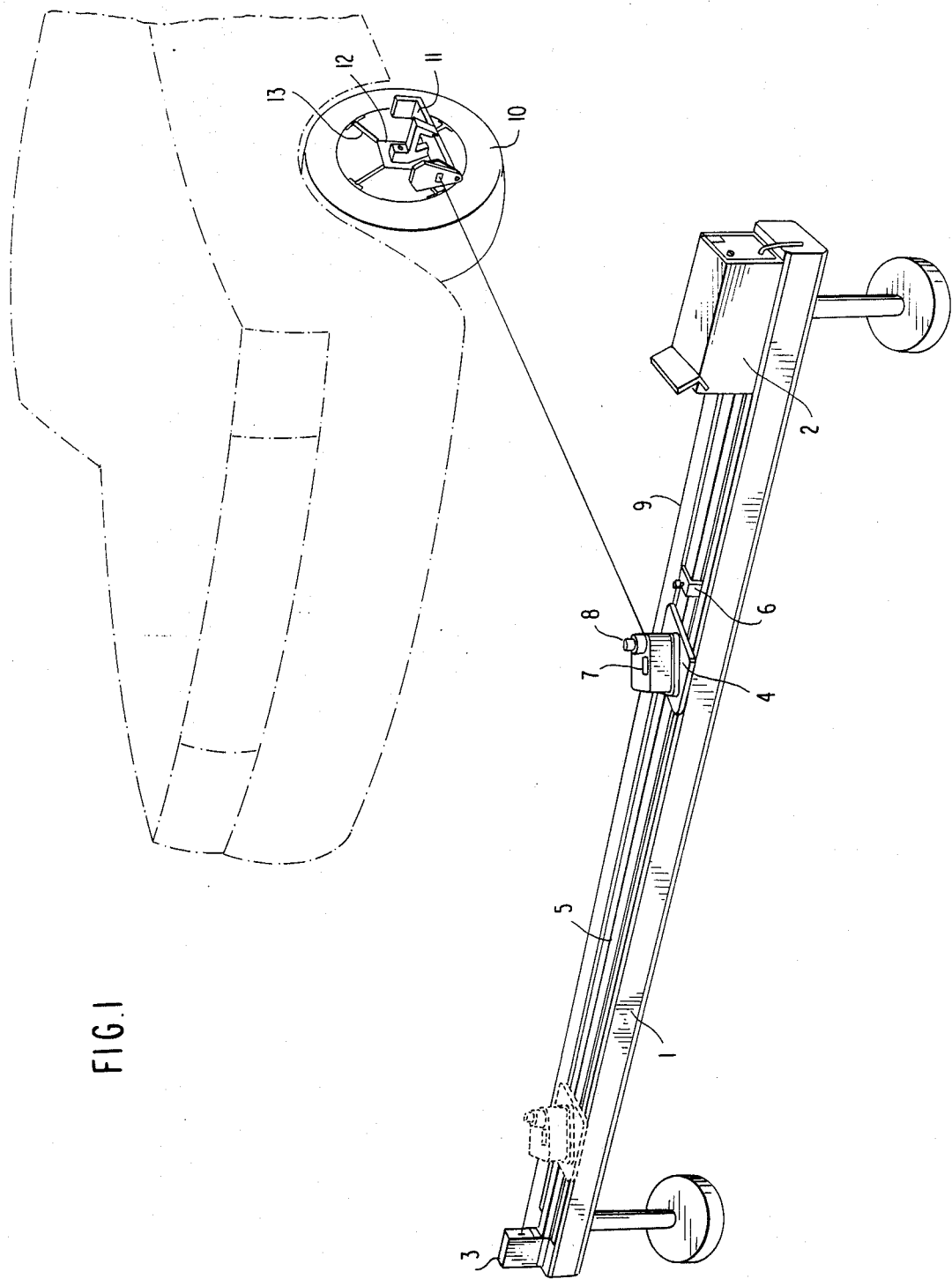
FIG. 1 is a schematic view in perspective of an apparatus according to this invention.

FIG. 1 illustrates a measuring bar 1 with a light source 2 disposed at one end thereof. The essential feature of the radiation source 2 is that the emitted radiation is narrow, visible and collimated. Suitable for this purpose is an HeNe laser. The other end of the bar accomodates a unit 3 upwardly projecting therefrom and provided with a marking. The lateral and vertical setting of the light source 2 is adjusted so that the emitted ray strikes the marking on unit 3, which will cause the ray to run parallel with the bar. A deflection unit 4, intended to deflect at least part of the radiation from the light source 2, is displaceable along said bar. Its movement along the bar can be measured e.g. by providing the unit 3 with a measuring tape 5, which is secured at its outer end to an end clamp 6 displaceable along the bar and lockable thereto, said clamp being settable anywhere along the bar to give a reference value. This property is described in Swedish patent specification No. 7103780-8. Instead of using a measuring tape, the bar itself can be provided with magnetic or optical markings, and the deflection unit may incorporate a reading unit for automatic reading of the movements of the unit 4 along the bar, as is described in Swedish patent application No. 8102307-9.

The deflection unit 4 is adjustable so that the ray from the light source 2 is bent in a horizontal plane, preferably at 90° to the bar. On that side of the deflection unit which is shown turned away in the Figure, there is disposed a unit (not shown) by means of which the ray emanating from the deflection unit 4 can be vertically set to any selected angular position. The unit 4 can also be designed to make the emitted ray adjustable for providing a few additional predetermined angular positions beyond 90° to the bar.

A target 11 is pivotally attached to a target support structure 12 which in turn is removably fixed to the wheel 10 by four attachments 13 in the shown embodiment pressed against the inner edge of the rin, for example by providing each attachment with a rotatably controllable expansion bolt, or by the attachments being slightly resilient.

Figure 6:
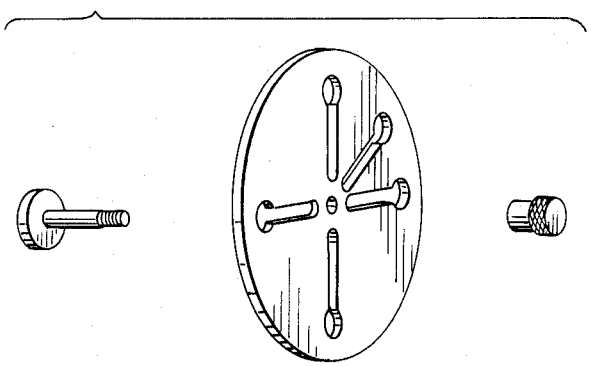
FIG. 6 is a schematic view in perspective of a target support structure attached to the wheel hub.
Figure 5A:
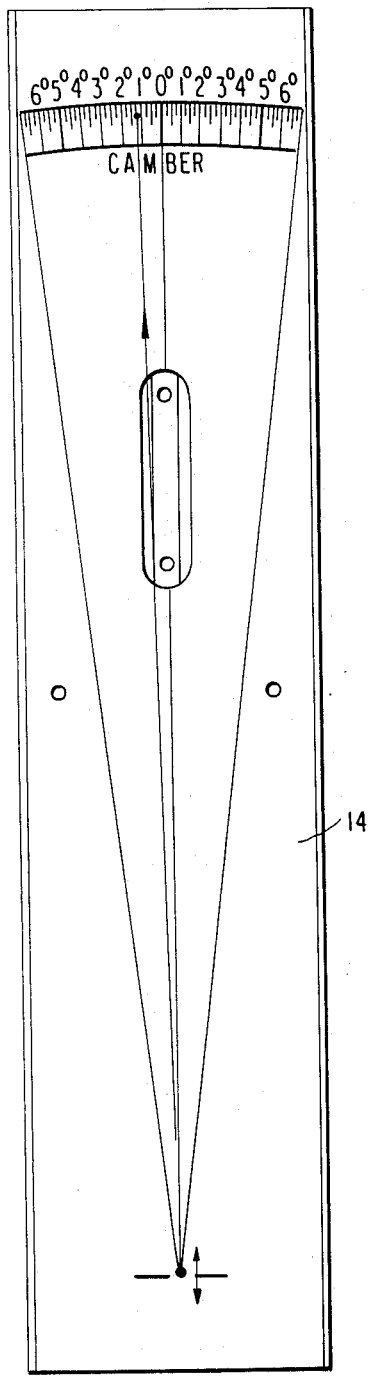
FIG. 5a-5d show the different scales contained on a target according to this invention.
Figure 5B:
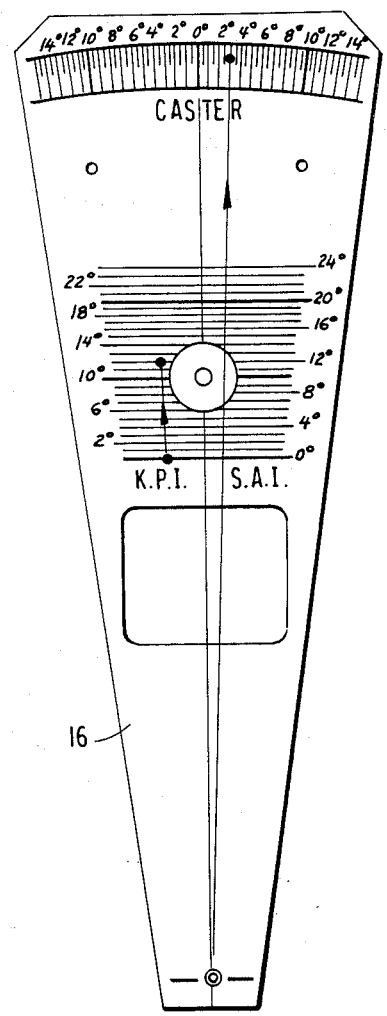
Figure 5C:
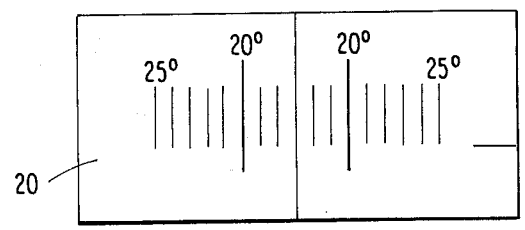
Figure 5D:
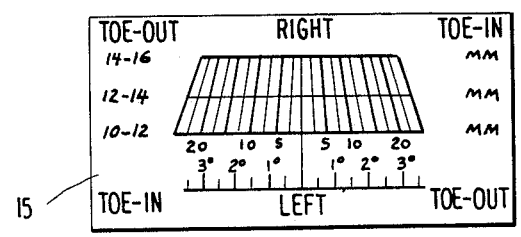

In this respect it may be observed that when the apparatus of the invention is used to check the symmetry of the wheel suspension during straightening work on a damaged vehicle disposed on a work bench with the wheels removed another type of attachment must be used. In such a case it is proposed to use magnetic holders to connect the target support structure with the wheel hub and such an arrangement is schematically shown in FIG. 6.

Both types of target support structures have a support shaft projecting from the structures parallel to the wheel axis, to which shaft the target is connected.

Figure 2:
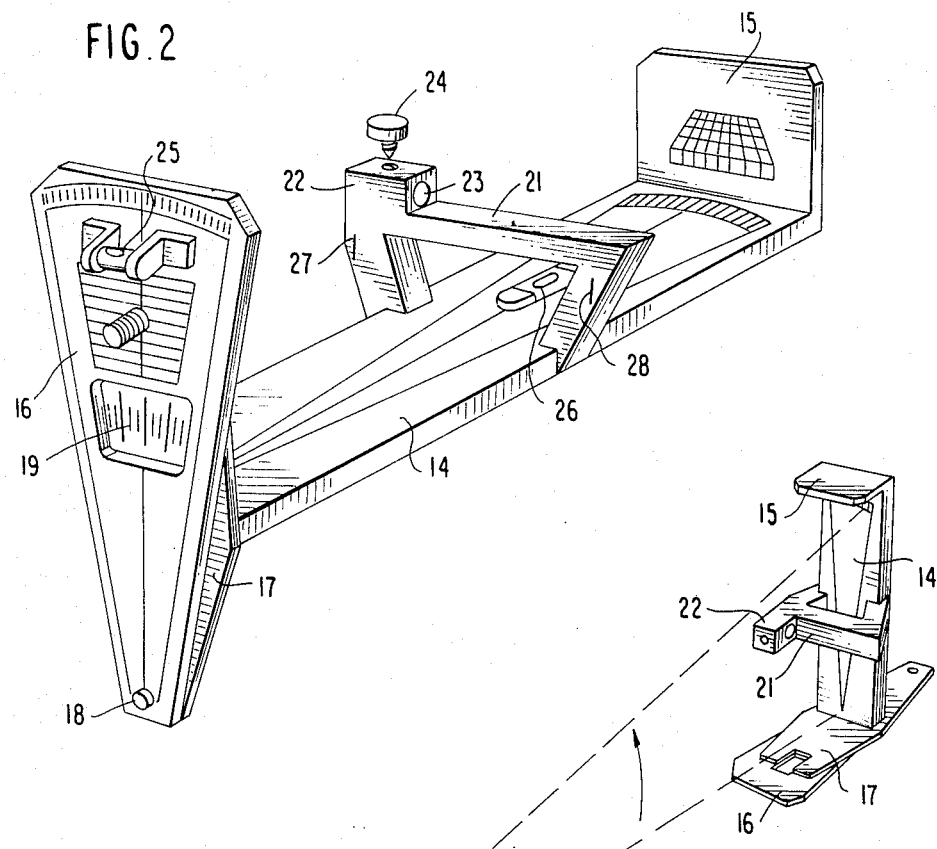
FIG. 2 is a perspective view of a first embodiment of a target utilized in the apparatus of the invention.

A first embodiment of the target 11 is shown in FIG. 2. As disclosed in this figure the target 11 comprises a planar elongated plate 14 provided with a scale for measuring the camber angles, i.e. the angle the center line of wheel makes with a vertical axis. Two end plates 15, 16 provided with scales for measuring toe-in, i.e the mount that both wheels are closer together at the front than at the rear of the wheel, and caster, i.e. the cant of the upper ball joint toward the rear of the vehicle, respectively extend from the respective ends of plate 14 at right angles to a plane containing to plate 14. In the released condition the plate 16 is at 18 pivotally attached to plate 17. A window 19, 20 respectively is cut out in plates 16 and 17 for making it possible to direct a light beam on plate 15 as will be described later.

A handle 21 substantially in the form of an inverted U is extended transversely across the plate 14 substantially in the middle thereof. The legs of the U-formed handle 21 are rigidly attached to the edges of the elongated plate 14 in any appropriate manner. An extension 22 of the left leg of the U-formed handle 21 as shown in FIG. 2 extends above the base of the handle and comprises a through-hole 23 running parallel to a plane containing the plate 14 and perpendicular to the longitudinal direction of that plate. The hole 23 is adapted to receive the support shaft of the target support structure and in order to immobilize an inserted shaft a set screw 24 can be screwed into a threaded bore in the extension 22 ending in said through-hole.

The target can thus be positioned in arbitrary angular relationship relative to the support shaft of the target support structure by appropriate operation of the set screw and suitable pivoting of the target around the support shaft.

Spirit levels 25, 26 are disposed on plate 16 and 14 respectively.

Figure 3:
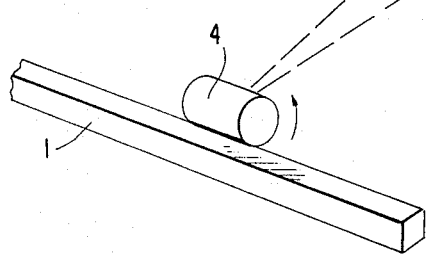
FIG. 3 is a schematic view showing how to measure a camber angle with the apparatus according to FIGS. 1-2.

Now with reference to FIGS. 3-5 a method for measuring the alignment of the wheels of a wheel vehicle will be described utilizing an apparatus according to the invention which have been described with reference to FIGS. 1 and 2.

The vehicle is placed on a planar ground with roller plates disposed under the wheels. The bar is located in front of the vehicle perpendicular to the longitudinal axis thereof and disposed in a plane parallel to the bottom plate of the vehicle. Furthermore, the bar is disposed at such a height that the beam emitted from the light source will penetrate the windows 19, 20 of the target and run parallel to the plate 14 when the target is positioned with said plate in horizontal position. In this connection it should be observed that the calibrating procedures for locating the bar principally correspond to the calibrating procedures for ordinary alignment measuring with this optical measuring system and need not to be further described in connection with this invention.

Figure 4A:
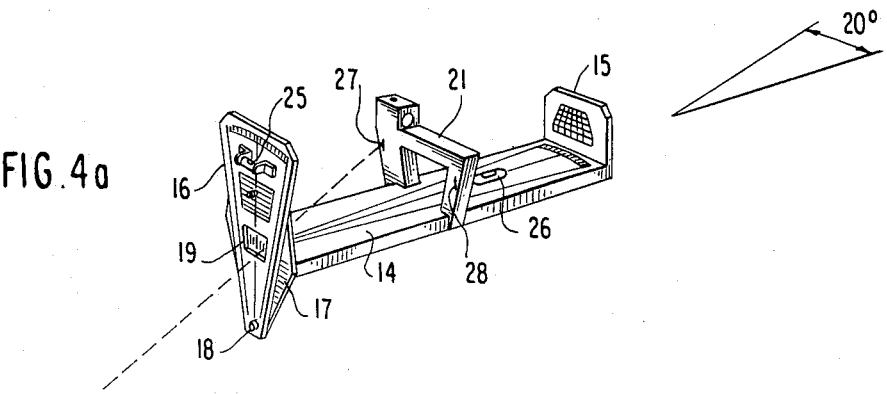
FIG. 4a-4d are schematic views showing the successive steps for measuring caster and king pin inclination.
Figure 4B:
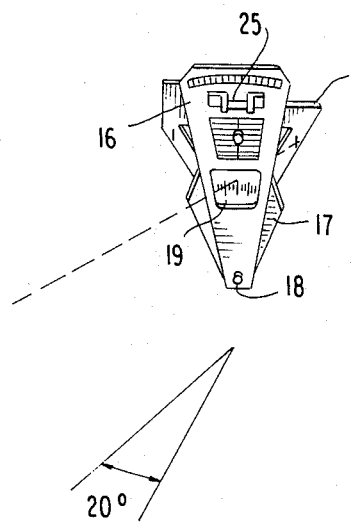
Figure 4C:
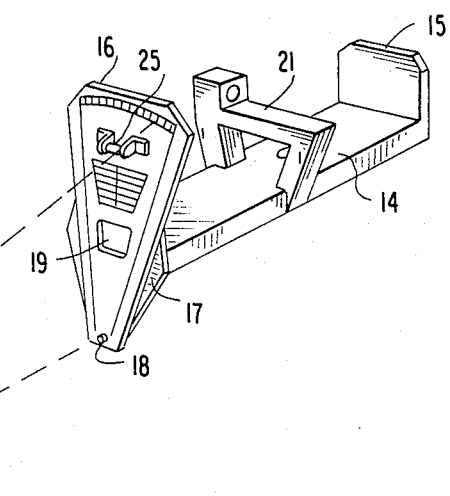
Figure 4D:
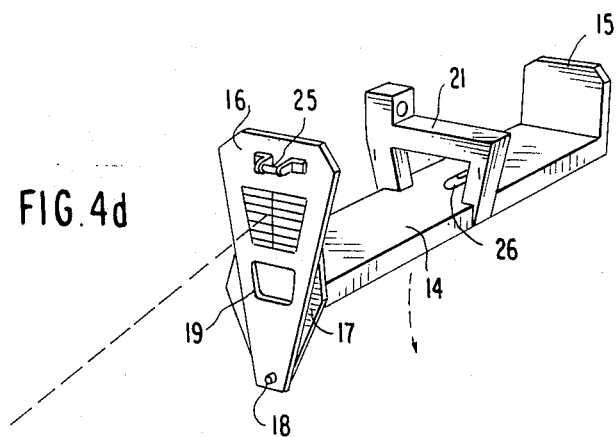

After the calibrating has been done the wheel alignment measuring is accomplished in the following manner:

1. The front of the vehicle is lifted so that the wheels are freely rotatable;
2. The target support structure and the target are mounted on the wheel in question;
3. Rim distortion is checked by unscrewing the set screw 24 so that the wheel is freely rotatable relative to the target. Thereafter the target is turned to vertical position (i.e. the plate 14 being vertical) and the laser beam is directed against the lower zero on the camber scale (cf. FIG. 3). The wheel is then rotated while the target is held in vertical position. The impinging point of the laser beam should not move transversely on the target. If this should happen the wheel is rotated to its position where the divergence has its highest value whereafter an adjustment of the target support structure is made by moving the attachments 13 in relation to the rim or by adjusting the set screws of the arrangement shown in FIG. 6. If two sets of apparatus according to the invention are used the same procedure is performed on the opposite wheel;
4. The wheels are immobilized with the aid of the brakes by using a brakepedal jack;
5. The vehicle is sunk down onto the roller plates. These are unlocked and the vehicle is strongly rocked. The steering wheel is thereafter rotated to its neutral position;
6. The camber angle is measured (see FIG. 3) by rotating the target to vertical position and directing the laser beam to the lower zero of the camber scale. The deflection unit 4 is then locked in its position on the bar 1 and angled upwards to impinge on the upper indicia on the camber scale. The value of the scale is read and noted;
7. For measuring the caster angle, toe-in/toe-out and king pin inclination (also called steering axis cant) the target thereafter is rotated to horizontal position. The wheel is then turned 20° inwards which can be achieved either by making the laser beam penetrating the transparent scale (see FIG. 5c) contained in window 20 of the plate 17 impinge on the vertical marking 27 on the left leg of handle 21 while penetrating the right 20° marking on said scale in window 20 or by reading the indicia on the roller plate. However, it is preferred to make a course positioning with the help of the indicia on the roller plate followed by a fine adjustment using the apparatus according to the invention (FIG. 4a);
8. The two spirit levels 26, 25 are thereafter set to zero by adjustment of the target around the support shaft and by pivoting the plate 16 relative to plate 17 respectively. The target is then carefully locked to the support shaft by set screw 24 so that it not by mistake will change position during the measuring;
9. The wheel is turned to a position 20° outwards of its neutral position in a manner corresponding to the manner described under point 7 (FIG. 4b). The laser beam is then directed to the zero of the caster scale (see FIG. 5b) and the deflection unit 4 is locked against displacement on bar 1. The spirit level 25 on the vertical plate 16 of the target is thereafter set to zero and the laser beam indicia of the caster scale is read and noted (FIG. 4c);
10. The laser beam is after than angled down to the zero line of the scale for king pin inclination (K.P.I.) also contained on plate 16. The spirit level on the horizontal plate 14 of the target is then set to zero and the K.P.I.-value is read and noted (FIG. 4d);
11. The procedures under point 6–10 are repeated for the opposite wheel and the values are noted.

Before measuring toe-in/toe-out it is controlled that the laser beam runs in the longitudinal direction of the vehicle and that the steering wheel and the steering gear respectively are in neutral positions. After this it is ensured that the target is rotated to horizontal postition. The laser beam is directed through the zero line on the transparent scale in window 20 and its impinging point on the toe-in/toe-out scale on the rear end plate 15 is read and noted. The same procedure is then repeated for the opposite wheel.

It is to be observed that the measured vales of toe-in/toe-out indicate the individual deviation of the wheel from the center line of the vehicle. Any desired adjustments will be done separately on the individual wheel if such an adjustment is possible with the vehicle model in question.

The tracking is checked by rotating the "outer wheel" inwards 20° and by reading the angle the opposite wheel has turned with the help of the laser beam or the roller plate. This procedure is followed in both directions and the values are noted.

When the adjustment of the front of the vehicle is ready the target support structure and the target are moved to the rear of the vehicle. A new control of rim distortion is made together with a control of the direction of the laser beam. Thereafter measuring of toe-in/toe-out and camber angles of the rear of the vehicle takes place in the same manner as described above for the front of the vehile.

Figure 7:
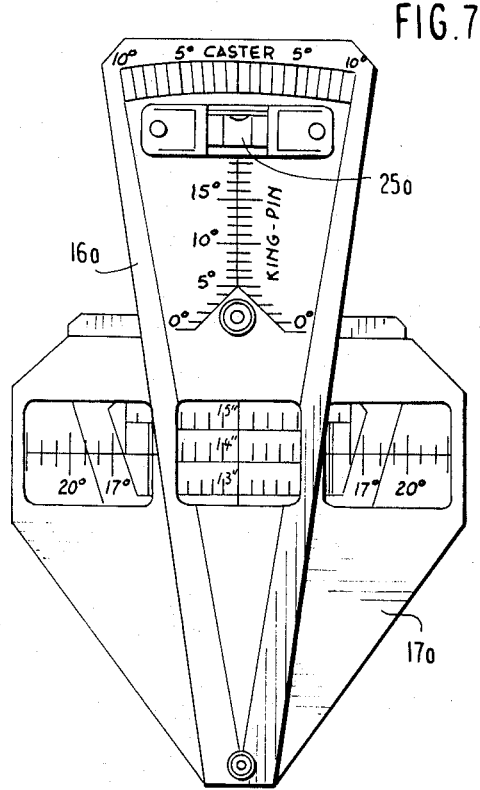
FIG. 7 is an end view of a ssecond embodiment of a target utilized in the apparatus according to this invention as seen in the direction of the emitted beam from the light source of the apparatus of the invention.
Figure 9:
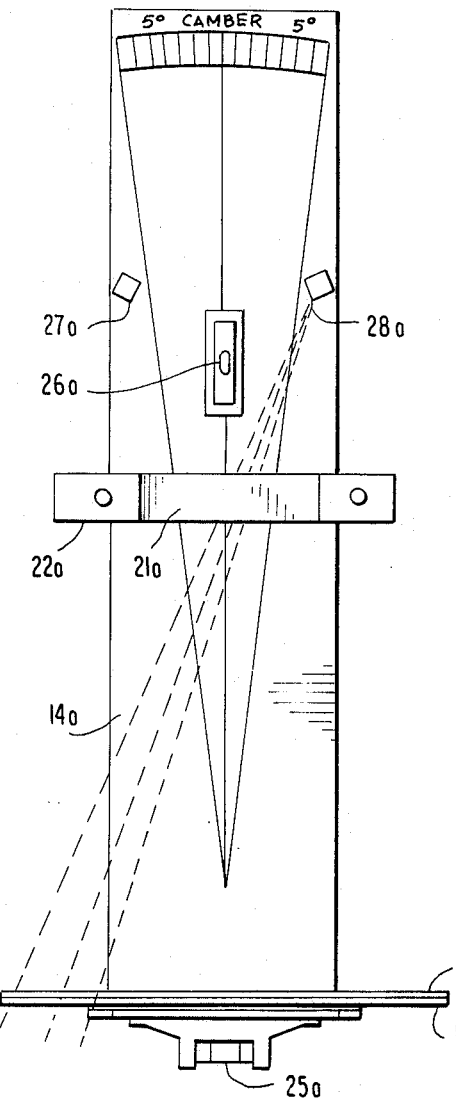
FIG. 9 is a side view of the target in FIG. 7.
Figure 8:
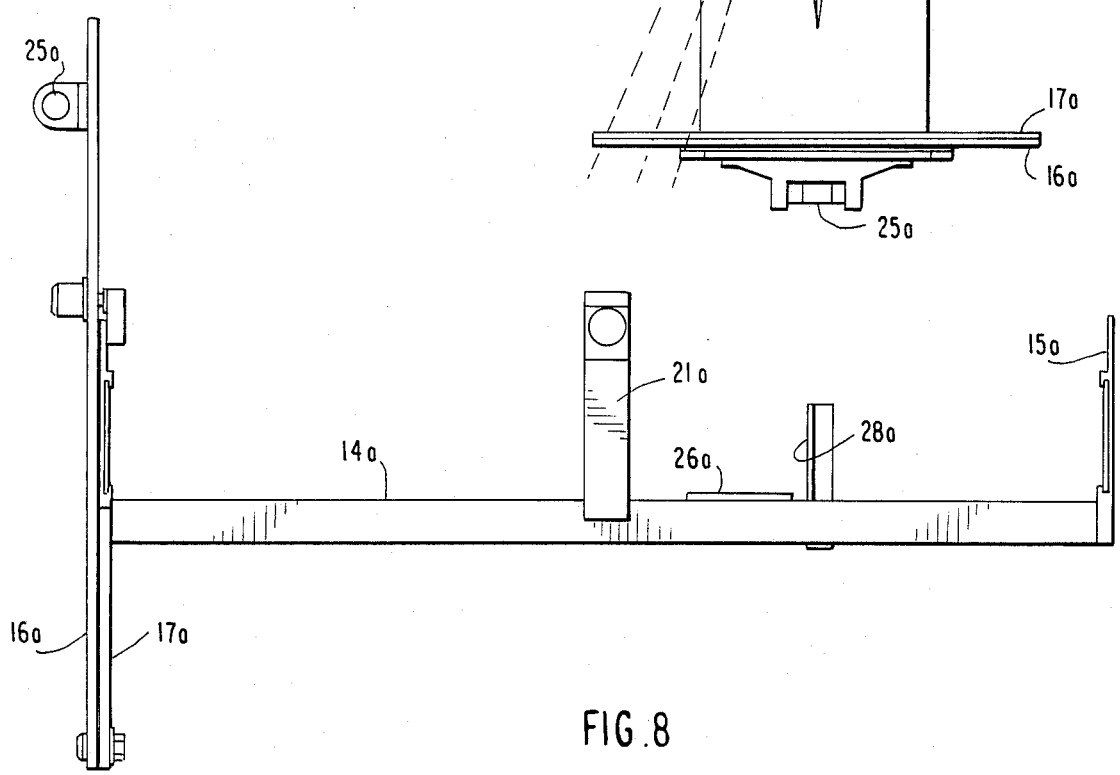
FIG. 8 is a plan view of the target in FIG. 7.

In FIGS. 7-9 is disclosed a second embodiment of a target for use in an apparatus according to the invention. The design of the second embodiment is principally the same as for the first embodiment shown in FIGS. 1 and 2 and similar elements have been given the same reference numerals with the addition of an "a" for the second embodiment. The main differences between the two embodiments are that the handle 21a comprises two extensions 22a whereby the target can be used together with a left wheel as well as a right wheel and that the end plate 17a in addition to a window cooperating with the window in the pivotable end plate 16a has two side windows containing transparent scale for indicating the deviation of the wheel from a vertical plane through the length axis of the vehicle when the laser beam penetrates such a scale and impinges on the forward edge of an upright 28a as illustrated by dotted lines in FIG. 9.

From the foregoing description it is apparent that the wheel alignment apparatus of the present invention enables the wheel alignment measures to be easily and quickly made with few and simple procedural steps. By using a laser beam accurate measuring is also obtained.

It is to be understood that the invention is not limited to the illustrated embodiments and that the scope of the invention should only be restricted by the contents of the following claims.

I claim:
1. An apparatus for checking the alignment of the wheels of a wheeled vehicle, said apparatus comprising:
   a substantially horizontal meausring bar placed in front of and spaced from the vehicle at right angles to the longitudinal axis of the vehicle along which bar a light source emitting a narrow collimated beam of light is movable, said beam being emitted in a vertical plane perpendicular to the length direction of the bar, said light source including means for positioning said beam in different directions in said vertical plane;
   a target pivotally connected to a support shaft parallel to the wheel axis and protruding from the wheel plane, which support shaft is part of a target support structure removably attached to a wheel of a vehicle, said target being provided with a plurality of scales for indicating alignment measurements on said wheels;
   said target comprising a planar elongated plate which is provided with end plates projecting from the respective end perpendicualr to a plane containing said elongated plate at least on one side thereof, said elongated plate being pivotable about said support shaft in order to let said beam impinge on scales one ither the elongated plate or the end plates.
2. The apparatus set forth in claim 1 wherein:
   said elongated plate comprises a second end plate in the end which is intended to be turned towards the light source when the target is pivoted for measurements with said light beam impinging on the scales on said end plates, said second end plate is pivotally attached to the first end plate in said end of the elongated plate.
3. The apparatus set forth in claim 2 comprising levels attached to said elongated plate and said second end plate.
4. A method for checking the alignment of the wheels of a wheeled vehicle comprising the steps of:
   establishing a line of sight from a sighting instrument parallel to an laterally spaced from a longitudinal axis of a vehicle;
   attaching a target support structure to a wheel and a scaled target to a support shaft osf said structure, said target being rotatably supported by said shaft;
   locating said target in vertical position;
   directing said line of sight to impinge on a lower zero of the scale of the part of the target facing the sighting instrument in said vertical position of the target;
   angling said line of sight vertically upwards to impinge on the upper part of said scale on the target;
   reading and noting the value on said scale;
   locating the target in horizontal position;
   turning the wheel 20° inwards in relation to its neutral position and setting to zero levels disposed on the substantially horizontal part of the target and on the vertical end part of the target facing the sighting instrument in the horizontal position of the target which end part is pivotally connected to said horizontal part in a transverse, vertical plane;
   turning the wheel 20° outwards to its neutral position;
   directing the line of sight to a lower zero of a first scale on said vertical end part of the target and thereafter setting its level to zero;
   vertically angling the line of sight to impinge on the upper part of said first scale on said vertical end part of the target;
   reading and noting the value on said first scale;
   angling the line of sight down to a zero line of a second scale on said vertical end of the target;
   setting the level on said horizontal part of the target to zero;
   reading and noting the value on said second scale.
5. The method set forth in claim 4 including:
   locating the wheel in neutral position and the target in horizontal position;
   directing the line of sight to penetrate the zero line of a third transparent scale on said vertical end part of the target and to impinge on a scale of a second vertical end part of the target in the opposite end of the horizontal part of the target.

* * * * *